United States Patent
Kondou et al.

(10) Patent No.: US 8,306,372 B2
(45) Date of Patent: Nov. 6, 2012

(54) WAVEGUIDE-TYPE POLARIZER

(75) Inventors: Katsutoshi Kondou, Chiyoda-ku (JP); Masanao Kurihara, Chiyoda-ku (JP); Toru Sugamata, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 80 days.

(21) Appl. No.: 13/065,737

(22) Filed: Mar. 29, 2011

(65) Prior Publication Data

US 2011/0243493 A1  Oct. 6, 2011

(30) Foreign Application Priority Data

Mar. 30, 2010 (JP) ................................. 2010-079292

(51) Int. Cl.
*G02B 6/00* (2006.01)
(52) U.S. Cl. ........... 385/11; 385/1; 385/2; 385/3; 385/4; 385/5; 385/6; 385/7; 385/8; 385/9; 385/10; 385/14; 385/129; 385/130; 385/131; 385/132
(58) Field of Classification Search ........... 385/1–11, 385/14, 129–132
See application file for complete search history.

(56) References Cited

U.S. PATENT DOCUMENTS

| | | | |
|---|---|---|---|
| 2007/0104407 A1* | 5/2007 | Mitomi et al. | 385/8 |
| 2007/0127862 A1* | 6/2007 | Mitomi et al. | 385/8 |
| 2007/0147722 A1* | 6/2007 | Kondo et al. | 385/2 |

FOREIGN PATENT DOCUMENTS

JP  2613942 B2  2/1997

OTHER PUBLICATIONS

Jamid, H.A., et al., "TM-Pass Polarizer Using Metal-Clad Waveguide with High Index Buffer Layer," Electronics Letters, vol. 24, No. 4 (Feb. 1988), pp. 229-230.
Veasey, D.L., et al., "Waveguide Polarizers with Hydrogenated Amorphous Silicon Claddings," Optics Letters, vol. 16, No. 10 (May 15, 1991), pp. 717-719.
Minakata, M., "LiNbO3 Optical Waveguide Devices," Transactions of Institute of Electronics, Information and Communication Engineers, vol. J77-C-I, No. 5 (May 1994), pp. 194-205 (with partial English translation).
"Polarization Scramblers at the Input Side of Embedded Polarizers," Sumitomo Osaka Cement Technical Report (1996), pp. 24-25 (with English abstract).
Lin, H., et al., "A Waveguide Polarizer Based on Si-Coated Ti:LiNbO3 Planar Structure," Chinese Optics Letters, vol. 2, No. 2 (Feb. 10, 2004), pp. 89-91.

* cited by examiner

*Primary Examiner* — Brian M. Healy
*Assistant Examiner* — Guy Anderson
(74) *Attorney, Agent, or Firm* — Chapman and Cutler LLP

(57) ABSTRACT

The waveguide-type polarizer includes: a Z-cut lithium niobate substrate; an optical waveguide having a ridge structure and formed on the substrate; a low refractive index film formed with a thickness satisfying $0 \leq n \cdot t/\lambda \leq 0.3742$ (where n is a refractive index, t (μm) is the thickness of the film, and λ (μm) is the wavelength of a light wave) on the side of the ridge structure; and a high refractive index film formed with a thickness satisfying $0.089 \leq n \cdot t/\lambda$ on the low refractive index film. The width of the ridge structure is a ridge width where the distribution of ordinary light of the light waves propagated through the optical waveguide changes and the distribution of extraordinary light of the light waves does not change, the angle of the ridge structure is less than 90°, and the waveguide-type polarizer has a function of transmitting extraordinary light.

4 Claims, 7 Drawing Sheets

WAVEGUIDE-TYPE POLARIZER

BACKGROUND OF THE INVENTION

1. Field of the Invention

Priority is claimed to Japan Pat. App. Ser. No. 2010-079292, filed Mar. 30, 2010, hereby incorporated by reference in its entirety.

The present invention relates to a waveguide-type polarizer and more particularly, to a waveguide-type polarizer in which an optical waveguide having a ridge structure is formed on a Z-cut lithium niobate substrate.

2. Description of Related Art

In the technical field of optical communication or optical information processing, an optical waveguide element having an electro-optical effect, such as a lithium niobate (LN) substrate, has been used. For example, there is an LN optical modulator in which a waveguide has a Mach-Zehnder (MZ) structure. In the modulator having the MZ structure, light is turned on or off by a voltage applied. Specifically, it is possible to turn light on or off on the basis of whether an output waveguide of the modulator having the MZ structure is in the single mode, or the fundamental mode and the exited mode in which the propagation speed of light changes depending on the voltage applied.

The characteristics of the LN optical modulator include Vπ and an optical bandwidth. Vπ is the voltage required to change light from an on state to an off state, and the optical bandwidth is a frequency response in which light is turned on or off. As Vπ is reduced and the optical bandwidth increases, the characteristics of the LN optical modulator are improved.

In order to reduce Vπ, it is necessary to reduce the thickness of a buffer layer and thus reduce the distance between an electrode and light. In order to widen the optical bandwidth, it is necessary to increase the thickness of the buffer layer such that a current is not concentrated on one point of the electrode. A predetermined reciprocal relationship is established between Vπ and the optical bandwidth. In order to reduce Vπ and widen the optical bandwidth, a ridge structure is used for the Z-cut LN substrate.

In recent years, a modulator that modulates intensity and a phase, such as a tandem optical modulator, has been mainly used. In order to control the intensity and phase, it is necessary to arrange a plurality of optical waveguides having the MZ structure. In particular, a DQPSK modulator using the Z-cut LN substrate requires six electrodes. Therefore, the modulation electrodes occupy most of the area of the surface of an LN optical modulator chip, which makes it difficult to integrate members for providing additional characteristics.

Since LN has anisotropy in the electro-optical effect, light polarized in a specific direction is incident on the LN optical modulator. In the LN optical modulator, in general, extraordinary light (ne) is polarized as incident light. However, since a commercial Ti-diffused optical waveguide having a ridge structure guides both extraordinary light (ne) and ordinary light (no), it is necessary to remove the ordinary light (no).

For example, as a method of forming an extraordinary light (ne) pass polarizer in which a Ti-diffused optical waveguide is formed on a Z-cut LN substrate, Prior Art Document 1 discloses a method of attaching a film-shaped polarizer to a connection portion between a chip and a fiber, or Prior Art Documents 2-5 disclose a method of forming a low refractive index film or a high refractive index film on a Ti-diffused optical waveguide.

However, the extraordinary light (ne) pass polarizer has the following disadvantages.

(1) Since the polarizer is attached between the chip and the fiber (waveguide), light loss is large. In addition, since the polarizer is attached to each chip, productivity is low.

(2) From the relationship between Vπ and the optical bandwidth, it is necessary to separately form a thin film of a polarizer and a thin film below the electrode, which results in low productivity. In addition, since a region for the polarizer is needed, the size of an LN chip increases.

PRIOR ART DOCUMENTS

Document 1: Sumitomo Osaka Cement Technical Report, 1996, p. 24
Document 2: Japanese Patent No. 2613942
Document 3: Electronics Letters, Vol. 24, No. 4, pp 229 (1988)
Document 4: Optics Letters, Vol. 16, No. 10, pp 717 (1991)
Document 5: Chinese Optics Letters, Vol. 2, No. 2, pp 89 (2004)
Document 6: Trans. of IEICE C-I Vol. J77-C-I, No. 5, p. 194 (1994)
Document 7: Tetsuro Yabu, "Introduction to Optical Waveguide Analysis" (Morikita Publishing Co., Ltd.)

SUMMARY OF THE INVENTION

The invention has been made in view of the above-mentioned problems and an object of the invention is to provide a waveguide-type polarizer capable of stably adding the function of a polarizer to an optical waveguide without using a special manufacturing process.

In order to solve the above-mentioned problems, according to a first aspect of the invention, there is provided a waveguide-type polarizer. The waveguide-type polarizer includes: a Z-cut lithium niobate substrate; an optical waveguide that has a ridge structure and is formed on the substrate; a low refractive index film that is formed with a thickness satisfying $0 \leq n \cdot t/\lambda \leq 0.3742$ (where n is a refractive index, t is the thickness of the film, $\lambda$ is the wavelength of a light wave, and the unit of the thickness and the wavelength is μm) on the side of the ridge structure; and a high refractive index film that is formed with a thickness satisfying $0.089 \leq n \cdot t/\lambda$ on the low refractive index film. The width of the ridge structure is a ridge width where the distribution of ordinary light of the light waves propagated through the optical waveguide changes and the distribution of the extraordinary light of the light waves does not change, the angle of the ridge structure is less than 90°, and the waveguide-polarizer has a function of transmitting extraordinary light.

According to a second aspect of the invention, in the waveguide-type polarizer according to the first aspect, the thickness of the low refractive index film may satisfy the following condition:

$$0.0935 \leq n \cdot t/\lambda \leq 0.3742.$$

According to a third aspect of the invention, in the waveguide-type polarizer according to the first or second aspect, a main component of the low refractive index film may be $SiO_2$, and impurities may be mixed with the $SiO_2$ film to control the refractive index of the film.

According to the first aspect of the invention, the waveguide-type polarizer includes the Z-cut lithium niobate substrate, the optical waveguide that has the ridge structure and is formed on the substrate, the low refractive index film that is formed with a thickness satisfying $0 \leq n \cdot t/\lambda \leq 0.3742$ (where n is a refractive index, t is the thickness of the film, $\lambda$ is the wavelength of a light wave, and the unit of the thickness and the wavelength is µm) on the side of the ridge structure, and the high refractive index film that is formed with a thickness satisfying $0.089 \leq n \cdot t/\lambda$ on the low refractive index film. The width of the ridge structure is a ridge width where the distribution of ordinary light of the light waves propagated through the optical waveguide changes and the distribution of the extraordinary light of the light waves does not change, and the angle of the ridge structure is less than 90°. In this way, the waveguide-type polarizer has a function of transmitting the extraordinary light. Therefore, it is possible to easily give an extraordinary light transmission polarizer function to an optical waveguide, for example, an acting portion to which the electric field of a modulation electrode is applied, without complicating a manufacturing process, by adjusting the width of the ridge and the film thickness of the low refractive index film or the high refractive index film.

According to the second embodiment of the invention, since the thickness of the low refractive index film satisfies $0.0935 \leq n \cdot t/\lambda \leq 0.3742$, it is possible to form the low refractive index film with a predetermined thickness or more. Therefore, it is possible to reduce a manufacturing error and obtain a stable performance.

According to the third embodiment of the invention, the main component of the low refractive index film is $SiO_2$, and impurities are mixed with the $SiO_2$ film to control the refractive index of the film. Therefore, it is possible to control the refractive index of the low refractive index film without using a special apparatus and avoid a coverage property specific to the apparatus.

DETAILED DESCRIPTION OF THE INVENTION

Figure 1:
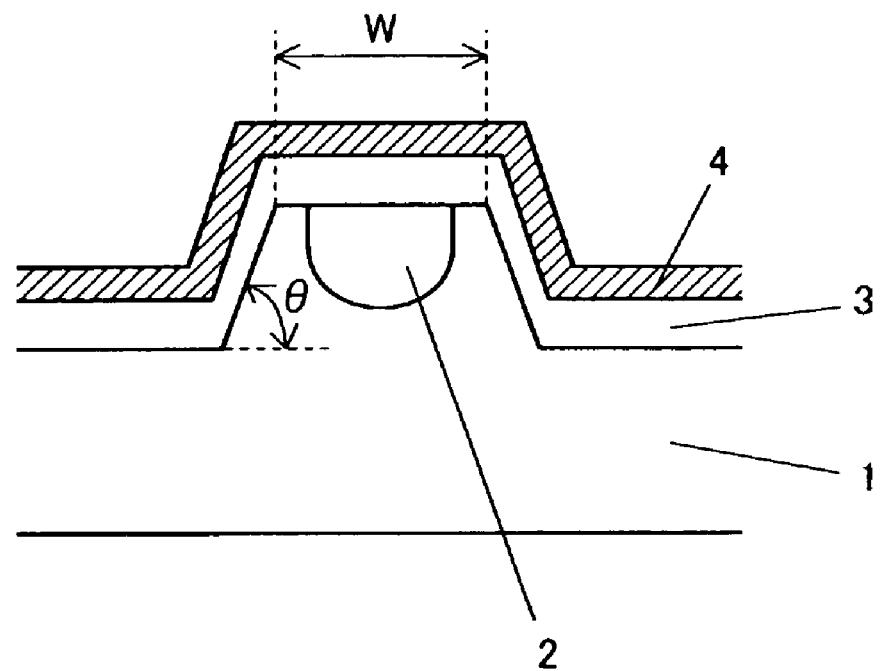
FIG. 1 is a cross-sectional view illustrating a waveguide-type polarizer according to an embodiment of the invention.

Hereinafter, a waveguide-type polarizer according to an exemplary embodiment of the invention will be described in detail. As shown in FIG. 1, a waveguide-type polarizer according to the invention includes a Z-cut lithium niobate substrate 1 and an optical waveguide that has a ridge structure and is formed on the substrate. The width w of the ridge structure is a ridge width where the distribution of ordinary light of light waves propagated through the optical waveguide changes and the distribution of extraordinary light of the light waves does not change. The angle θ of the ridge structure is less than 90°. A low refractive index film 3 with a thickness satisfying $0 \leq n \cdot t/\lambda \leq 0.3742$ (where n is a refractive index, t is the thickness of the film, λ is the wavelength of a light wave, and the unit of the thickness and the wavelength is µm) is formed on the side of the ridge structure. A high refractive index film 4 with a thickness satisfying $0.089 \leq n \cdot t/\lambda$ is formed on the low refractive index film. In this way, the waveguide-type polarizer has a function of transmitting extraordinary light.

As a method of forming an optical waveguide, trenches are formed on both sides of an optical waveguide 2 in a lithium niobate (LN) wafer on which the optical waveguide 2 having Ti thermally diffused therein is formed. In this way, the optical waveguide having a ridge structure is manufactured. A Ti diffusion process is performed using the technique disclosed in Prior Art Document 6. For example, the trench may be formed by the following methods: a method of performing wet etching or dry etching on the LN substrate using a resist and metal (for example, Ti or Ni) as a shielding mask; a laser processing method using an excimer laser; and a sand blasting method.

When a polarizer is manufactured on the wafer by the method (a method of forming, for example, a low refractive index film or a high refractive index film on a Ti-diffused optical waveguide) according to the related art, a buffer layer (BF layer) ($SiO_2$) and a charge dispersion layer (Si) are formed in regions other than a polarizer forming region. Since Vπ and an optical bandwidth are determined by the purpose of the design of an optical element, the BF layer and the charge dispersion layer have thicknesses suitable for the purpose. In a general LN light modulator, a $SiO_2$ film or a film including $SiO_2$ and a very small amount of impurity is used as the BF layer. After the BF layer is formed, a heat treatment is formed in order to increase the adhesion between the LN substrate and the BF layer or reduce the stress of the film. Therefore, when the polarizer is formed before the BF layer or the charge dispersion layer is formed, the polarizer is oxidized or the polarizer peels off due to a change in the volume of the film during the heat treatment of the BF layer. For this reason, after the BF layer and the charge dispersion layer are formed in a necessary portion, for example, an optical waveguide portion (hereinafter, referred to as an "acting portion") to which the electric field of a modulation electrode is applied, it is necessary to form the polarizer using the technique according to the related art.

The waveguide-type polarizer according to the invention includes the BF layer or the charge dispersion layer and the polarizer which are formed at the same time and may be manufactured by a film forming apparatus (for example, a deposition apparatus or a sputtering apparatus) with a low film coverage (the thickness of the film on the side of the ridge/the thickness of the film above the ridge). First, the BF layer is formed on the wafer having the ridge waveguide formed thereon by an apparatus with a low coverage and then a heat treatment is performed.

Figure 2:
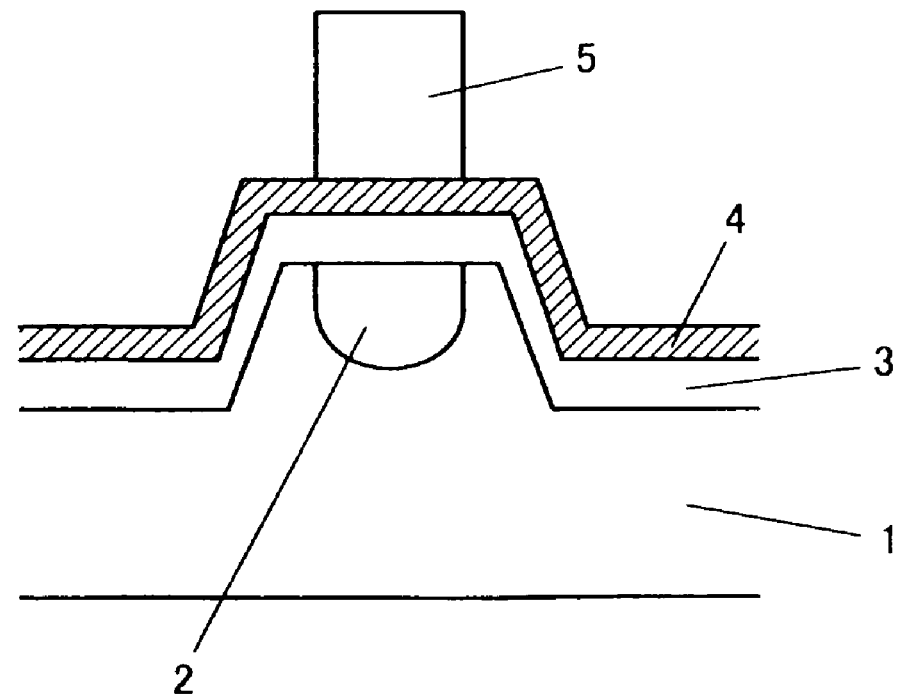
FIG. 2 is a cross-sectional view illustrating an acting portion of an optical waveguide.

FIG. 2 is a cross-sectional view illustrating the BF layer (low refractive index film) and the charge dispersion layer (high refractive index film) in the acting portion. Reference numeral 5 indicates a signal electrode, which is a portion of the modulation electrode.

When the waveguide-type polarizer according to the invention is manufactured, the apparatus with a low coverage is used. Therefore, even when the thickness of the BF layer above the ridge is 0.7 µm, the thickness of the BF layer on the side of the ridge is less than or equal to 0.4 µm. The coverage depends on, for example, the shape and specifications of the apparatus and the arrangement of the wafer. For example, the standard value of the coverage of the deposition apparatus is 0, and the standard value of the coverage of the sputtering apparatus is 0.5.

In general, the thickness of the BF layer above the ridge needs to be greater than or equal to 0.4 μm where main signal light (extraordinary light (ne)) is not attenuated by a charge dispersion film and a metal film (electrode). That is, the main signal light starts to be attenuated at about 0.4 μm. Then, the charge dispersion film, which is a high refractive index semiconductor film (for example, a Si film), is formed. In this way, a polarizer that transmits extraordinary light (ne) is formed.

Figure 3:
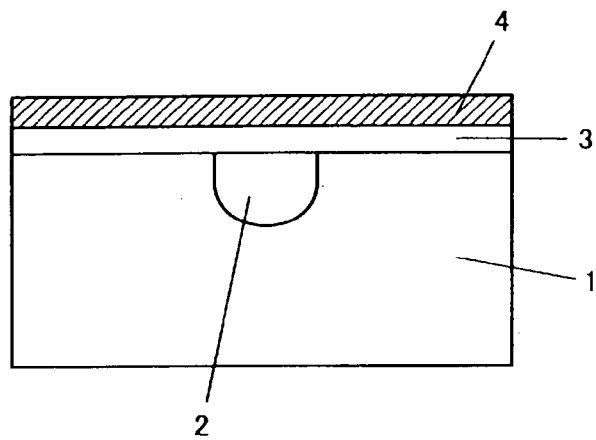
FIG. 3 is a cross-sectional view illustrating an example of a polarizer according to the related art.

FIG. 3 is a diagram illustrating the structure of the polarizer according to the related art. The Si film (high refractive index film) 4 is formed on the waveguide 2. The $SiO_2$ film 3 is not provided in some structures according to the related art. As in the technique disclosed in Prior Art Document 7, when the Si film has a large thickness, the Si film functions as a waveguide.

Figure 4:
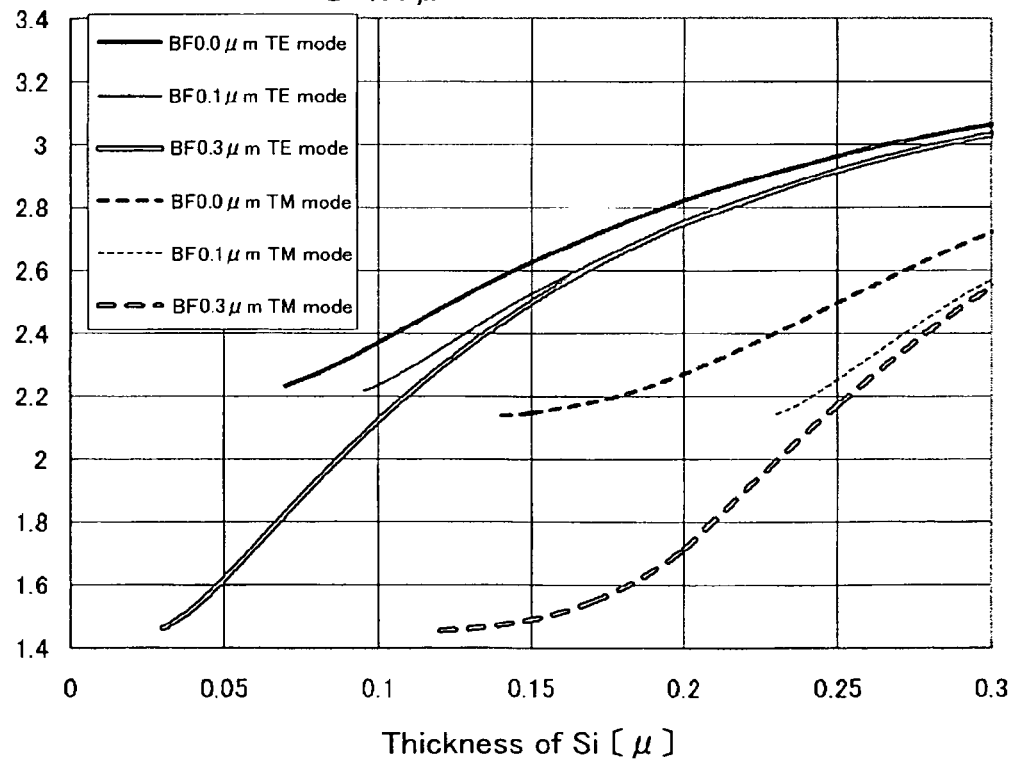
FIG. 4 is a graph illustrating the relationship between the thickness of a Si film shown in FIG. 3 and an effective refractive index.

The reason why the structure functions as the polarizer is as follows. As the thickness of the Si film increases, the TE mode is transferred to the propagation mode (see the graph shown in FIG. 4) first. FIG. 4 is a graph illustrating the relationship between the thickness of the Si film and an effective refractive index when a $SiO_2$ film (n=1.45) and a Si film (n=3.47) are formed on the Z-cut LN substrate. The thickness of the Si film is adjusted such that TE light is in the propagation mode (greater than or equal to 0.03 μm) and TM light is in the leaky mode (less than or equal to 0.11 μm). In this way, it is possible to transfer and diffuse ordinary light of the Ti-diffused waveguide to TE-mode light of the Si film 4. In this case, since extraordinary light of the Ti-diffused waveguide is not coupled with the TM-mode light of the Si film (that is, in the TM mode, there is no Si propagation mode), the extraordinary light can pass through the Ti-diffused waveguide. Therefore, a polarizer transmitting extraordinary light is formed. The TE mode and the TM mode with respect to the core thickness of the waveguide are When the $SiO_2$ film and the Si film are formed on the side of the Ti-diffused optical waveguide having the ridge structure and the mode distribution of light is not changed by polarization, it is possible to form a polarizer transmitting ordinary light for the same reason.

As shown in FIG. 1, there is a ridge angle θ in the actual shape of the ridge structure. Vat, which is a characteristic of the LN optical modulator, changes depending on the ridge angle θ of the LN substrate and is reduced as the ridge angle is closer to 90 degrees. However, when the ridge angle is greater than or equal to 70°, the ridge angle hardly contributes to Vπ (see Prior Art document 6), and it is difficult to make the ridge angle equal to 90 degrees. Therefore, in general, the ridge angle θ is in the range of 70° to 80°.

When the Z-cut LN substrate is used to form the Ti-diffused optical waveguide, a change in the refractive index with respect to the density of Ti is different in ordinary light and extraordinary light. Therefore, the mode distribution of ordinary light is large and the mode distribution of extraordinary light is small. When the width of the ridge is reduced without a ridge structure, TE-mode light is changed first with respect to the mode distribution of light.

Figure 5A:
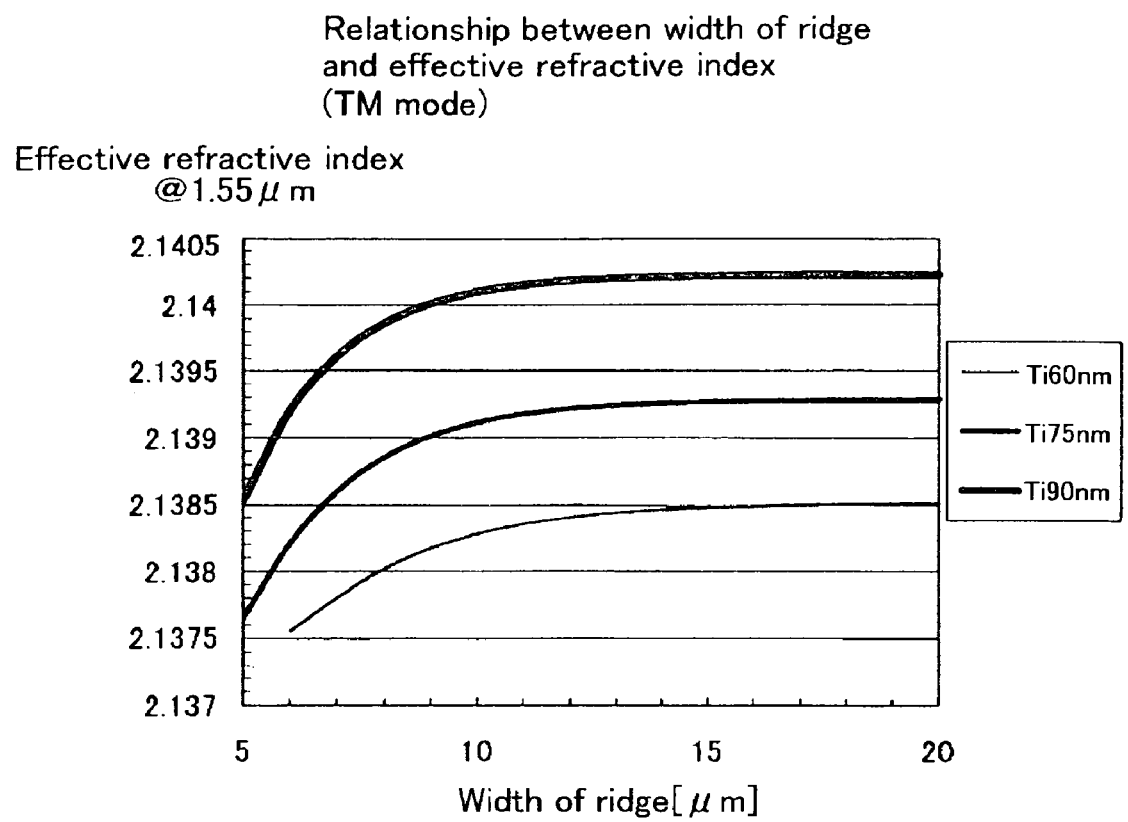
FIGS. 5A and 5B are graphs illustrating the relationship between the width of a ridge and the effective refractive index.
Figure 5B:
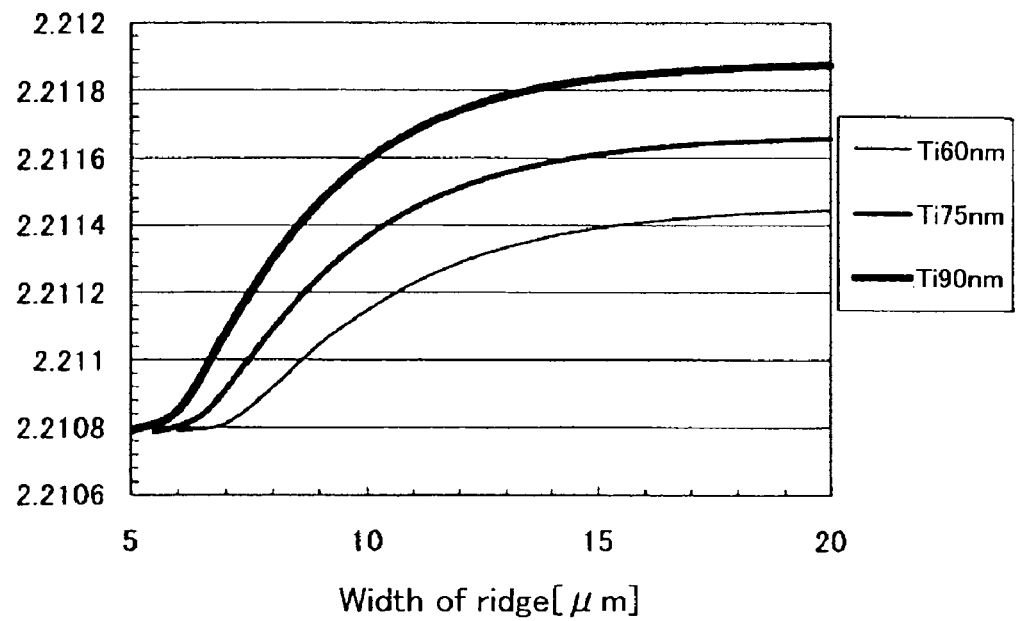

With the change in the distribution of light, light exaudes from the ridge, the effective refractive index (=the speed of light in vacuum/the speed of light in the waveguide) is reduced, and the correlation between the effective refractive index and the distribution of light is obtained. FIGS. 5A and 5B are graphs illustrating the relationship between the width of the ridge and the effective refractive index of the Ti-diffused waveguide. The graph shown in FIG. 5A shows the relationship between the width of the ridge and the effective refractive index in a TM mode of 1550 nm, and the graph shown in FIG. 5B shows the relationship between the width of the ridge and the effective refractive index in a TE mode of 1550 nm. When the width of the ridge is reduced, the effective refractive index is less than the refractive index of the LN substrate. This is because propagated light exudes from the ridge and there is a region in which the effective refractive index is less than the refractive index of the substrate. The width of the ridge where the effective refractive index is less than the refractive index of the substrate varies depending on polarization. Therefore, there is a region satisfying the following conditions:

The effective refractive index of ordinary light<the refractive index of the LN substrate<the effective refractive However, when the Si film is formed on the side of the ridge, it is possible to form a polarizer transmitting ordinary light. That is, in the Ti-diffused waveguide having a ridge structure, when the width of the ridge is reduced, first, ordinary light leaks from the ridge and is coupled with the Si film. When the ridge angle is 90°, the ordinary light is the TM mode with respect to the Si film formed on the side of the ridge. Therefore, when the Si film formed on the side of the ridge has a thickness capable of guiding only a light wave polarized in one direction, the ordinary light of the Ti-diffused waveguide cannot be coupled with the Si film disposed on the side of the ridge and then radiated from the Si film.

Figure 6A:
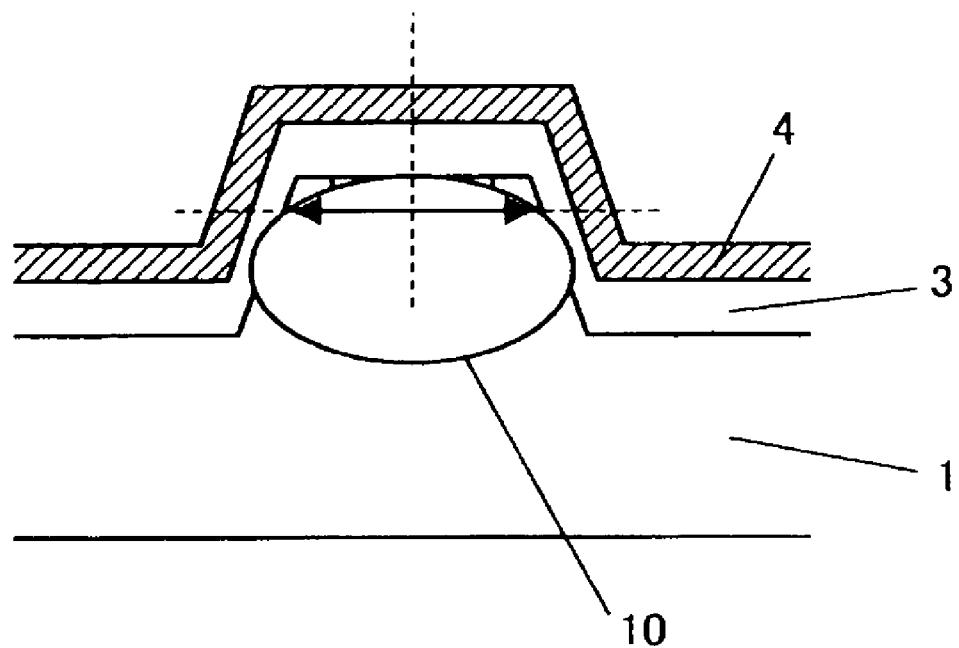
FIGS. 6A and 6B are diagrams illustrating the state of ordinary light propagated through a waveguide having a ridge structure.
Figure 6B:
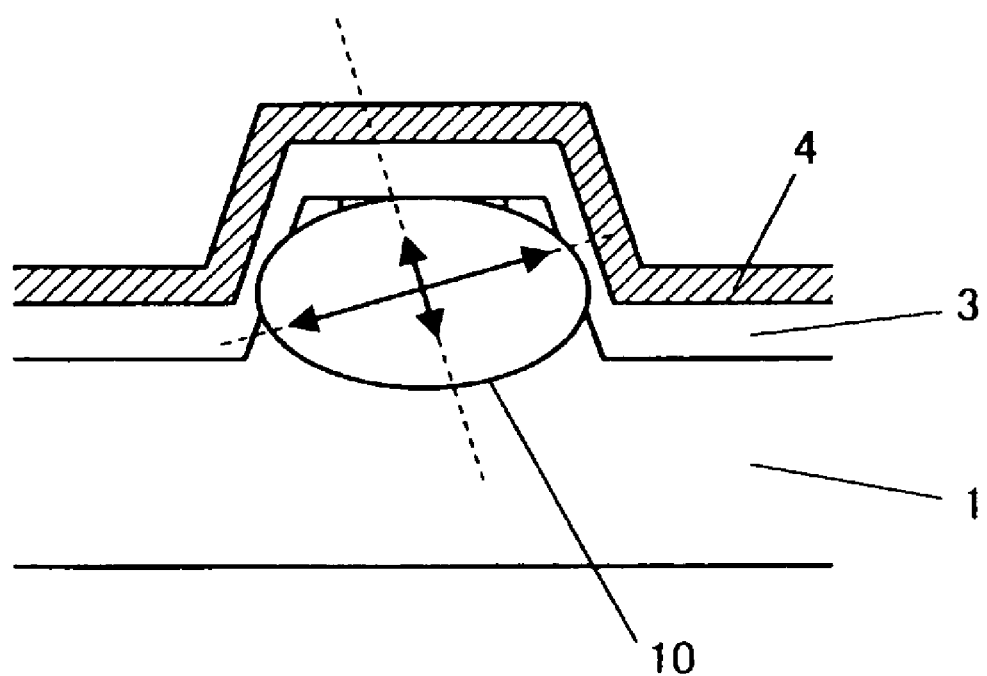

However, when the ridge angle is less than 90°, the ordinary light of the Ti-diffused waveguide is in a mixed state of the TM mode and the TE mode with respect to the Si film disposed on the side of the ridge. Therefore, even when the Si film disposed on the side of the ridge has a thickness capable of guiding only the light wave polarized in one direction, the coupling and radiation effects are less than those in a case in which the ridge structure is not provided, but the ordinary light of the Ti-diffused waveguide can be coupled with the Si film formed on the side of the ridge and then radiated. FIGS. 6A and 6B are diagrams illustrating the coupling of ordinary light with the Si film disposed on the side of the ridge and the radiation of the ordinary light. FIG. 6A shows the propagation of ordinary light 10 through the Ti-diffused waveguide in the ridge structure, and FIG. 6B shows the development of the ordinary light 10 shown in FIG. 6A in a rectangular coordinate system having the side surface of the ridge as one axis, in which a component parallel to the side surface of the ridge is coupled with the Si film and then radiated. In FIGS. 6A and 6B, the right side of the ridge is a reference surface. However, the left side of the ridge may be a reference surface.

When the thickness of the Si film above the ridge is fixed, the thickness of the Si film on the side of the ridge is regulated by coverage specific to the film forming apparatus. When the thickness of the $SiO_2$ film on the side of the ridge is changed, the manufacturing error of the thickness of the $SiO_2$ film on the side of the ridge directly contributes to the characteristics of the polarizer (see FIG. 4). In order to reduce the manufacturing error, the thickness of the BF layer is set to 0.1 μm or more. In this way, it is possible to reduce the influence of the thickness of the $SiO_2$ film disposed on the side of the ridge on the characteristics of the polarizer.

However, since the thickness of the $SiO_2$ film above the ridge is regulated by the characteristics of the LN optical modulator and the coverage is specific to the apparatus (the coverage is substantially fixed), it is necessary to change the refractive index of the $SiO_2$ film in order to maintain the characteristics of the polarizer. In order to change the refractive index of the low refractive index film, an appropriate amount of impurities, such as $TiO_2$, $In_2O_3$, and $SnO_2$, may be added to $SiO_2$.

The following three conditions need to be satisfied from the above.

(Condition 1)

In order to obtain the function of the polarizer, the ridge angle is less than 90°, and in a region in which the effective refractive index of the Ti-diffused waveguide with a ridge structure satisfies the following relationship:

the effective refractive index of ordinary light<the refractive index of the LN substrate<the effective refractive index of extraordinary light, the high refractive index film is formed with a thickness of 0.04 μm or more on the side of the ridge.

(Condition 2)

The low refractive index film with a thickness of 0.1 to 0.4 μm is formed between the side of the ridge and the high refractive index film, thereby reducing the manufacturing dependence of polarization.

(Condition 3)

Even in an apparatus with a constant coverage, impurities are added to the low refractive index film to change the refractive index such that Condition 2 is satisfied.

However, the film thicknesses are set such that the refractive index of the high refractive index film is 3.47 and the refractive index of the low refractive index film is 1.45. Therefore, when the film thicknesses are standardized, the "thickness of the high refractive index film is greater than or equal to 0.04 μm" on condition that "n·t/λ is greater than or equal to 0.089", and the "thickness of the low refractive index film between the side of the ridge and the high refractive index film is in the range of about 0.1 to 0.4 μm" on condition that "n·t/λ is in the range of about 0.0935 to 0.3742" (where n indicates a refractive index, t indicates the thickness of a film, and λ indicates the wavelength of light). In practice, it is difficult to directly confirm that the effective refractive index of the Ti-diffused waveguide with a ridge structure satisfies "the effective refractive index of ordinary light<the refractive index of the LN substrate<the effective refractive index of extraordinary light". Therefore, the boundary where the distribution of ordinary light components changes and the distribution of extraordinary light components does not change makes it possible to confirm that the structure according to the invention functions as a polarizer.

Example 1

Figure 7:
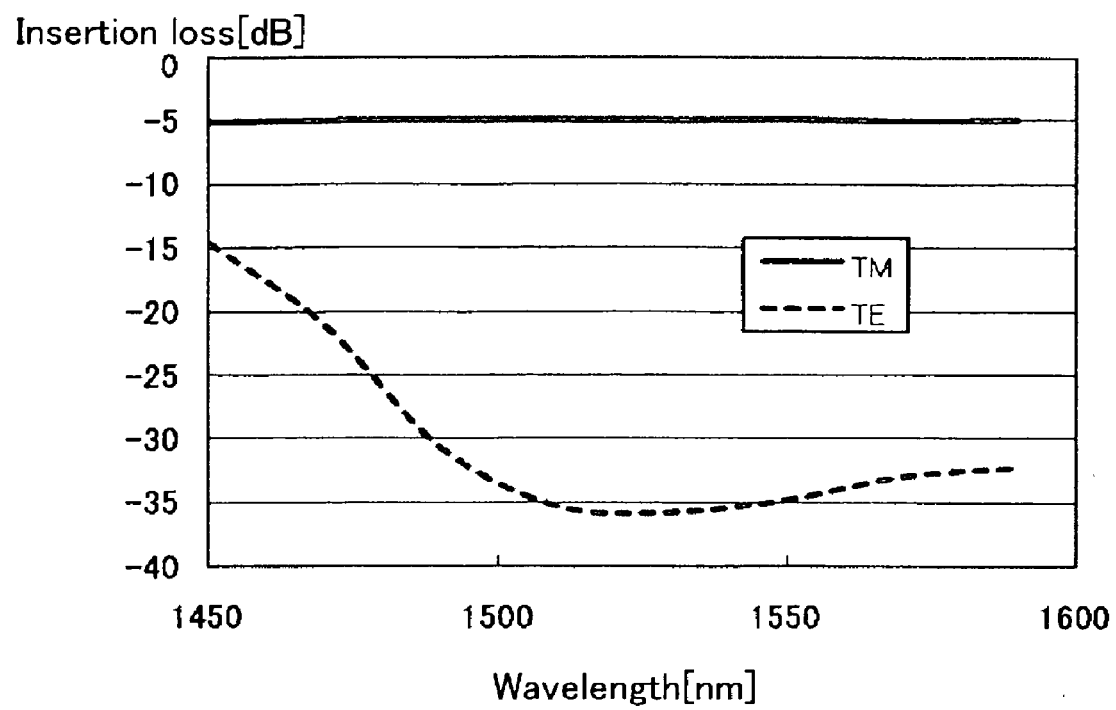
FIG. 7 is a graph illustrating the measurement result according to Example 1 of the invention.

A Ti (width: 7.0 μm and thickness: 75 nm) pattern was formed on a Z-cut LN substrate by general photolithography or a general deposition apparatus. Ti was thermally diffused into a wafer (at a temperature of 1000° C. for 14 hours). Then, in order to form a trench in the side of the Ti-diffused waveguide, dry etching was performed using a resist as an etching mask to form a trench with a depth of 5.0 μm, a ridge width of 8.0 μm, and a ridge angle of 75°. Then, a $SiO_2$ film (the thickness of a flat portion of the film was 0.6 μm and the thickness of a portion of the film on the side of the ridge was 0.3 μm) was formed as the low refractive index film by a magnetron sputtering apparatus, and an annealing process was performed at 600° C. for 5 hours. Then, an amorphous Si film (the thickness of a flat portion of the film was 100 nm and the thickness of a portion of the film on the side of the ridge was 50 nm) was formed as the high refractive index film by the magnetron sputtering apparatus. Then, the wafer was cut into samples with a length of 40 mm. In order to check the effect of the sample as a polarizer, light loss for each polarized light wave was measured. As a result, in a communication wavelength band, a polarizer function (TM insertion FIG. 7 is a graph illustrating the measurement result of the sample according to Example 1. The insertion loss of the TM mode (extraordinary light) does not depend on the wavelength and is −5 dB. On the other hand, the insertion loss of the TE mode (ordinary light) is small in the short wavelength range and is greater than or equal to −30 dB in the long wavelength range since the low refractive index film has a large thickness of 0.3 μm.

Example 2

Figure 8:
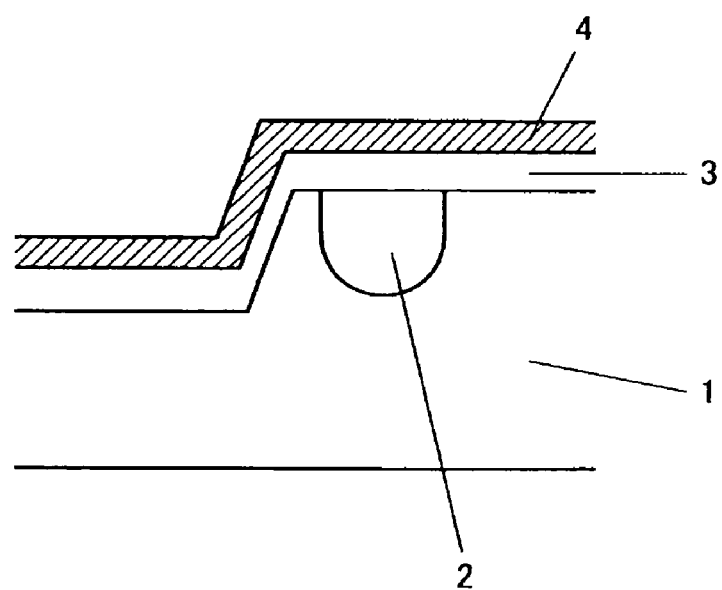
FIG. 8 is a diagram illustrating the structure of Example 2 of the invention.
Figure 9:
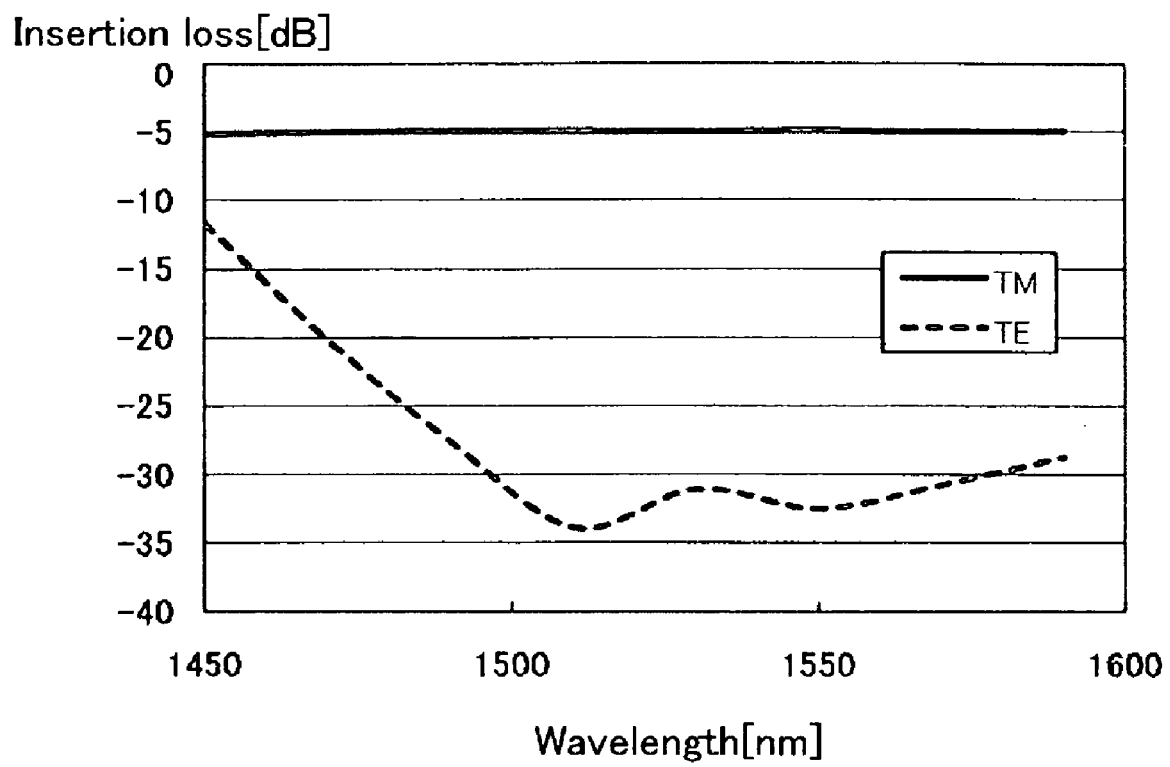
FIG. 9 is a graph illustrating the measurement result according to Example 2 of the invention.

The effect of a structure in which a trench was formed on one side of a Ti-diffused waveguide as shown in FIG. 8 was checked by the same method as that in Example 1. The check result is shown in the graph of FIG. 9. In FIG. 9, similar to Example 1, the insertion loss of the TE mode (ordinary light) is small in the short wavelength range and is greater than or equal to −30 dB in the long wavelength range.

As described above, according to the invention, it is possible to provide a waveguide-type polarizer capable of stably adding the function of a polarizer to an optical waveguide without using a special manufacturing process.

What is claimed is:

1. A waveguide-type polarizer comprising:
   a Z-cut lithium niobate substrate;
   an optical waveguide that has a ridge structure and is formed on the substrate; characterized in that
   a low refractive index film is formed with a thickness satisfying $0 \leq n \cdot t/\lambda \leq 0.3742$ (where n is a refractive index, t is the thickness of the film, λ is the wavelength of a light wave, and the unit of the thickness and the wavelength is μm) on the side of the ridge structure; and
   a high refractive index film is formed with a thickness satisfying $0.089 \leq n \cdot t/\lambda$ on the low refractive index film,
   wherein the width of the ridge structure is a ridge width where the distribution of ordinary light of the light waves propagated through the optical waveguide changes and the distribution of the extraordinary light of the light waves does not change,
   the angle of the ridge structure is less than 90°, and
   the waveguide-type polarizer has a function of transmitting extraordinary light.

2. The waveguide-type polarizer according to claim 1, wherein the thickness of the low refractive index film satisfies the following condition:

$0.0935 \leq n \cdot t/\lambda \leq 0.3742$.

3. The waveguide-type polarizer according to claim 1, wherein a main component of the low refractive index film is $SiO_2$, and
   impurities are mixed with the $SiO_2$ film to control the refractive index of the film.

4. The waveguide-type polarizer according to claim 2, wherein a main component of the low refractive index film is $SiO_2$, and
   impurities are mixed with the $SiO_2$ film to control the refractive index of the film.

* * * * *